United States Patent
Long et al.

(10) Patent No.: US 11,615,140 B2
(45) Date of Patent: Mar. 28, 2023

(54) METHOD AND APPARATUS FOR DETECTING TEMPORAL ACTION OF VIDEO, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Xiang Long, Beijing (CN); Dongliang He, Beijing (CN); Fu Li, Beijing (CN); Xiang Zhao, Beijing (CN); Tianwei Lin, Beijing (CN); Hao Sun, Beijing (CN); Shilei Wen, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 330 days.

(21) Appl. No.: 17/144,523

(22) Filed: Jan. 8, 2021

(65) Prior Publication Data
US 2021/0216783 A1   Jul. 15, 2021

(30) Foreign Application Priority Data
Jan. 10, 2020   (CN) .......................... 202010026651.3

(51) Int. Cl.
*G06F 16/738*   (2019.01)
*G06V 20/40*    (2022.01)
(Continued)

(52) U.S. Cl.
CPC .......... *G06F 16/738* (2019.01); *G06F 18/214* (2023.01); *G06F 18/253* (2023.01);
(Continued)

(58) Field of Classification Search
CPC . H04L 67/535; H04N 21/44226; G06F 15/16; G06V 20/46
See application file for complete search history.

(56) References Cited

U.S. PATENT DOCUMENTS 6,751,354 B2 * 6/2004 Foote .................. G06F 18/2415
                                                     382/209
6,768,811 B2 * 7/2004 Dinstein ............ G06Q 30/0201
                                                     382/128
(Continued)

FOREIGN PATENT DOCUMENTS

CN   108352174 A    7/2018
CN   108986186 A   12/2018
(Continued)

OTHER PUBLICATIONS

Extended European Search Report of European application No. 21150669.6 dated May 25, 2021, 7 pages.
(Continued)

*Primary Examiner* — Yosef Kassa
(74) *Attorney, Agent, or Firm* — Brooks Kushman P.C.

(57) ABSTRACT

A method includes screening, by a video-clip screening module in a video description model, a plurality of video proposal clips acquired from a video to be analyzed, to acquire a plurality of video clips suitable for description. The plural video proposal clips acquired from the video to be analyzed may be screened by the video-clip screening module to acquire the plural video clips suitable for description; and then, each video clip is described by a video-clip describing module, thus avoiding description of all the video proposal clips, only describing the screened video clips which have strong correlation with the video and are suitable for description, removing the interference of the description of the video clips which are not suitable for description in the description of the video, guaranteeing the accuracy of the
(Continued)

final descriptions of the video clips, and improving the quality of the descriptions of the video clips.

20 Claims, 4 Drawing Sheets

(51) Int. Cl.
G06F 18/214 (2023.01)
G06F 18/25 (2023.01)
(52) U.S. Cl.
CPC .............. *G06V 20/47* (2022.01); *G06V 20/49* (2022.01); *G06F 18/259* (2023.01)

(56) References Cited

U.S. PATENT DOCUMENTS

| | | | | |
|---|---|---|---|---|
| 7,813,724 | B2* | 10/2010 | Gronner | H04N 7/17309 |
| | | | | 455/414.4 |
| 8,549,550 | B2* | 10/2013 | Lopatecki | H04L 67/535 |
| | | | | 725/12 |
| 8,768,438 | B2* | 7/2014 | Mestha | A61B 5/02416 |
| | | | | 600/473 |
| 9,517,731 | B2* | 12/2016 | Dry | B60R 11/02 |
| 2014/0153784 | A1 | 6/2014 | Gandolph et al. | |
| 2017/0185846 | A1 | 6/2017 | Hwangbo et al. | |
| 2017/0345153 | A1 | 11/2017 | Wang | |
| 2018/0225519 | A1 | 8/2018 | Chen et al. | |

FOREIGN PATENT DOCUMENTS

| | | |
|---|---|---|
| CN | 109121022 A | 1/2019 |
| CN | 109688428 A | 4/2019 |
| CN | 110309360 A | 10/2019 |
| CN | 110334360 A | 10/2019 |
| JP | 2018124969 A | 8/2018 |

OTHER PUBLICATIONS

Summons to attend oral proceedings pursuant to Rule 115(1) EPC of European patent application No. 21150669.6 dated Nov. 29, 2022, 26 pages.

Ma et al., A Survey of Image Captioning, Journal of Chinese Information Processing, vol. 32, No. 4, Apr. 2018, pp. 1-12.

\* cited by examiner

METHOD AND APPARATUS FOR DETECTING TEMPORAL ACTION OF VIDEO, ELECTRONIC DEVICE AND STORAGE MEDIUM

CROSS-REFERENCE TO RELATED APPLICATIONS

The present application claims the priority of Chinese Patent Application No. 202010026651.3, filed on Jan. 10, 2020, with the title of "Method and Apparatus for Generating Descriptions of Video Clips, Electronic Device and Storage Medium." The disclosure of the above application is incorporated herein by reference in its entirety.

TECHNICAL FIELD

The present application relates to the technical field of computers, and particularly relates to video processing technologies, and particularly to a method and apparatus for generating descriptions of video clips, an electronic device and a storage medium.

BACKGROUND

Usually, a technology for generating descriptions of video clips has many important applications, such as provision of a basis for video retrieval, help with a video watching action of a visual impairment person, assistance with intelligent caption generation, or the like.

In this technology, text descriptions of video content are mainly generated for plural clips in a video by analyzing and understanding image information, motion information and audio information in the video. The plural clips may be clips predicted by an algorithm to be suitable for description generation, or specific clips which are artificially specified. Generally, the existing technology is divided into two separate stages: a first stage of predicting video content clips suitable for description generation and a second stage of generating a description for each clip. Specifically, in the first stage, a video-clip detecting model is trained using the clips which are suitable for description generation, are annotated by a human and correspond to each video. The video-clip detecting model takes the whole video as input, and outputs starting points and ending points of the plural video clips. Then, in the second stage, the video is clipped according to the video clips annotated by the human, and each video clip is annotated with the corresponding description of the video to train a video-clip-description generating model. The video-clip-description generating model takes each single video clip as input, and outputs the description corresponding to each single video clip.

In the existing process of generating descriptions of video clips, the descriptions corresponding to all the video clips detected by the video-clip detecting model are generated by the video-clip-description generating model. However, the video clips detected by the video-clip detecting model do not always have strong correlation with the current video and are suitable for description, resulting in inaccuracy of the final descriptions of the video clips.

SUMMARY

In order to solve the above-mentioned technical problems, the present application provides a method and apparatus for generating descriptions of video clips, an electronic device and a storage medium, so as to improve the accuracy of descriptions of video clips.

In an aspect, the present application provides a method for generating descriptions of video clips, including screening, by a video-clip screening module in a video description model, a plurality of video proposal clips acquired from a video to be analyzed, so as to acquire a plurality of video clips suitable for description; and describing each video clip by a video-clip describing module in the video description model.

Further optionally, in the method as mentioned above, the video-clip screening module and the video-clip describing module in the video description model are trained jointly.

Further optionally, before the screening, by a video-clip screening module in a video description model, a plurality of pre-acquired video proposal clips, so as to acquire a plurality of video clips suitable for description, the method as mentioned above further includes extracting, by a video-clip proposing module in the pre-trained video description model, the plural video proposal clips from the video to be analyzed; or acquiring the plural video proposal clips manually extracted from the video to be analyzed; further, the video-clip proposing module, the video-clip screening module and the video-clip describing module in the video description model are trained jointly if the video description model further includes the video-clip proposing module.

Further optionally, in the method as mentioned above, the extracting, by a video-clip proposing module in the pre-trained video description model, the plural video proposal clips from the video to be analyzed includes extracting each video frame in the video to be analyzed; extracting video frame features in the video frames by at least one of a pre-trained first sub-model, a pre-trained second sub-model and a pre-trained third sub-model respectively to obtain corresponding video frame feature sequences, wherein at least one video frame feature sequence is obtained in total; for each video frame feature sequence, acquiring a corresponding clip confidence map by a pre-trained confidence statistical model, wherein at least one clip confidence map is obtained in total; and acquiring the plural video proposal clips in the video to be analyzed according to the at least one clip confidence map.

Further optionally, in the method as mentioned above, the acquiring the plural video proposal clips in the video to be analyzed according to the at least one clip confidence map includes if only one clip confidence map is included, acquiring top N video clips according to the decreasing confidences of the video clips in the clip confidence map as the corresponding video proposal clips; and if at least two clip confidence maps are included, performing weighted fusion on the confidences of the same clips in the at least two clip confidence maps to obtain the fused confidences of the clips; and acquiring top N video clips according to the decreasing fused confidences of the clips as the corresponding video proposal clips.

Further optionally, in the method as mentioned above, the screening, by a video-clip screening module in a video description model, a plurality of video proposal clips, so as to acquire a plurality of video clips suitable for description includes acquiring the feature of the video to be analyzed; acquiring the feature of each video proposal clip; and screening the plural video clips suitable for description from the plural video proposal clips using a pre-trained classification model, the feature of the video to be analyzed and the feature of each video proposal clip.

Further optionally, in the method as mentioned above, the screening the plural video clips suitable for description from the plural video proposal clips using a pre-trained classification model, the feature of the video to be analyzed and the feature of each video proposal clip includes inputting the feature of each of the plural video proposal clips and the feature of the video to be analyzed into the classification model, and acquiring a probability value output by the classification model; judging whether the output probability value is greater than a preset probability threshold; and if yes, determining the video proposal clip as one video clip suitable for description, wherein the plural video clips suitable for description are obtained in total.

In another aspect, the present invention further provides a method for training a video description model, including independently pre-training a video-clip screening module and a video-clip describing module in the video description model; and jointly training the pre-trained video-clip screening module and the pre-trained video-clip describing module.

Further optionally, if the video description model further includes a video-clip proposing module, the method as mentioned above further includes independently pre-training the video-clip proposing module in the video description model; and jointly training the pre-trained video-clip proposing module, the pre-trained video-clip screening module and the pre-trained video-clip describing module.

Further optionally, in the method as mentioned above, the jointly training the pre-trained video-clip proposing module, the pre-trained video-clip screening module and the pre-trained video-clip describing module includes keeping any two of the video-clip proposing module, the video-clip screening module and the video-clip describing module fixed in sequence, and training the third module with a reinforcement learning method until the three modules are trained.

In still another aspect, the present application further provides an electronic device, including at least one processor; and a memory communicatively connected with the at least one processor; wherein the memory stores instructions executable by the at least one processor, and the instructions are executed by the at least one processor to enable the at least one processor to perform a method for generating descriptions of video clips, the method includes screening, by a video-clip screening module in a video description model, a plurality of video proposal clips acquired from a video to be analyzed, so as to acquire a plurality of video clips suitable for description; and describing each video clip by a video-clip describing module in the video description model.

In yet another aspect, the present application further provides an electronic device, including at least one processor; and a memory communicatively connected with the at least one processor; wherein the memory stores instructions executable by the at least one processor, and the instructions are executed by the at least one processor to enable the at least one processor to perform a method for training a video description model, the method includes independently pre-training a video-clip screening module and a video-clip describing module in the video description model; and jointly training the pre-trained video-clip screening module and the pre-trained video-clip describing module.

In yet another aspect, the present application further provides a non-transitory computer-readable storage medium storing computer instructions therein, wherein the computer instructions are used to cause the computer to perform a method for generating descriptions of video clips, the method includes screening, by a video-clip screening module in a video description model, a plurality of video proposal clips acquired from a video to be analyzed, so as to acquire a plurality of video clips suitable for description; and describing each video clip by a video-clip describing module in the video description model.

In still another aspect, the present application further provides a non-transitory computer-readable storage medium storing computer instructions therein, wherein the computer instructions are used to cause the computer to perform a method for training a video description model, the method includes independently pre-training a video-clip screening module and a video-clip describing module in the video description model; and jointly training the pre-trained video-clip screening module and the pre-trained video-clip describing module.

One embodiment in the above-mentioned application has the following advantages or beneficial effects. The plural video proposal clips acquired from the video to be analyzed may be screened by the video-clip screening module to acquire the plural video clips suitable for description; and then, each video clip is described by the video-clip describing module, thus avoiding description of all the video proposal clips, only describing the screened video clips which have strong correlation with the video and are suitable for description, removing the interference of the description of the video clips which are not suitable for description in the description of the video, guaranteeing the accuracy of the final descriptions of the video clips, and improving the quality of the descriptions of the video clips. Moreover, since the video-clip screening module is introduced to screen the video clips, the video proposal clips may be more focused on the recall of the video, which may facilitate acquisition of video clips which are more diversified, thus improving diversification of the subsequent descriptions of the video clips.

Further, in the present application, the modules in the video description model are pre-trained in advance, thus solving the technical problems that models are trained independently in the prior art to cause inapplicability among the models and descriptions of video clips are inaccurate; the joint pre-training process of the modules in the video description model may effectively guarantee the compatibility among the modules in the video description model, and the consistency of a training process and an application process, avoid the condition of a good training effect but an unsatisfactory application effect, guarantee the improvement of the overall effect during the application, and effectively improve the quality and accuracy of the descriptions of the video clips.

Further, in the present application, the at least one video frame feature sequence is acquired by at least one of the pre-trained first sub-model, the pre-trained second sub-model and the pre-trained third sub-model; the at least one clip confidence map is acquired by the pre-trained confidence statistical model; the plural video proposal clips in the video to be analyzed are acquired according to the at least one clip confidence map; this solution is more focused on the recall of the proposal clips, thus acquiring the video proposal clips which are more diversified, guaranteeing the completeness and diversity of the video proposal clips, and then facilitating subsequent acquisition of the more comprehensive and accurate descriptions of the video clips.

Further, in the present application, the corresponding video frame feature sequences may be acquired by at least two sub-models, so as to acquire the corresponding clip confidence maps, and the confidences of the same clips in the at least two clip confidence maps are subjected to the weighted fusion to obtain the fused confidences of the clips, which guarantees the quality of the video proposal clips when the video proposal clips are extracted based on the fused confidences of the clips, and then guarantees the quality of the video clips suitable for description, thus effectively improving the accuracy of the final description of the video.

Further, in the present application, the plural video clips suitable for description may be screened from the plural video proposal clips using the pre-trained classification model, the feature of the video to be analyzed and the feature of each video proposal clip, thus screening the video proposal clips with the strongest correlation with the video as the video clips suitable for description, and then effectively improving the accuracy of the description of the video to guarantee the quality of the description of the video.

Further, in the present application, in the training process, the modules in the video description model are not only pre-trained independently, but also jointly trained, thus avoiding the problem that the application and training processes are inconsistent after the independent training process to cause the inaccuracy of the descriptions of the video clips, and effectively improving the accuracy and quality of the descriptions of the video clips.

Other effects of the above-mentioned alternatives will be described below in conjunction with embodiments.

BRIEF DESCRIPTION OF THE DRAWINGS

The drawings are used for better understanding the present solution and do not constitute a limitation of the present application. In the drawings.

DETAILED DESCRIPTION

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and concise- ness, the descriptions of the known functions and structures are omitted in the descriptions below.

Figure 1:
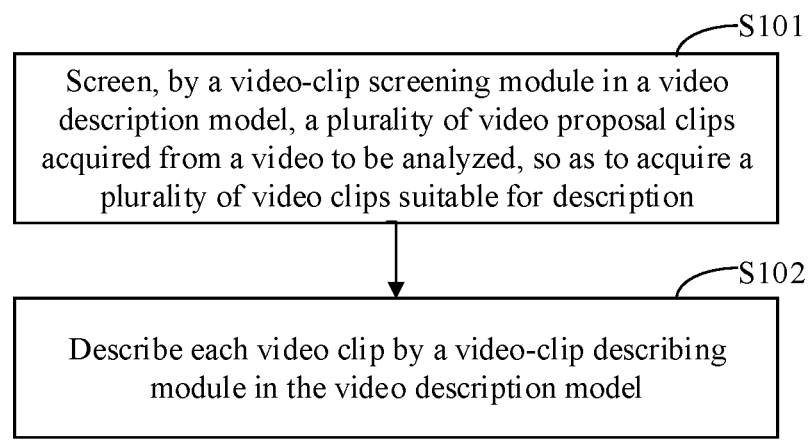
FIG. 1 shows a flow chart of a method for generating descriptions of video clips according to a first embodiment of the present application.

FIG. 1 shows a flow chart of a method for generating descriptions of video clips according to a first embodiment of the present application. As shown in FIG. 1, the method for generating descriptions of video clips according to this embodiment may include the following steps:

S101, screening, by a video-clip screening module in a video description model, a plurality of video proposal clips acquired from a video to be analyzed, so as to acquire a plurality of video clips suitable for description; and S102, describing each video clip by a video-clip describing module in the video description model.

An apparatus for generating descriptions of video clips may serve as the execution subject of the method for generating descriptions of video clips according to this embodiment, and may be configured as an independent electronic entity or an application integrated by software. In use, a plurality of video proposal clips of a video to be analyzed are input into the apparatus for generating descriptions of video clips, and the apparatus for generating descriptions of video clips may acquire a plurality of video clips suitable for description from the video proposal clips, and generate and output the descriptions of the plural video clips.

In this embodiment, the video-clip screening module and the video-clip describing module are not two modules which are completely independent, and jointly belong to the video description model. Optionally, the video-clip screening module and the video-clip describing module in the video description model in this embodiment are trained jointly before use.

Further optionally, the plural video proposal clips acquired from the video to be analyzed in this embodiment may include a plurality of video proposal clips which are manually extracted from the video to be analyzed; in this implementation, a developer may manually extract the plural video proposal clips from the video to be analyzed.

Figure 2:
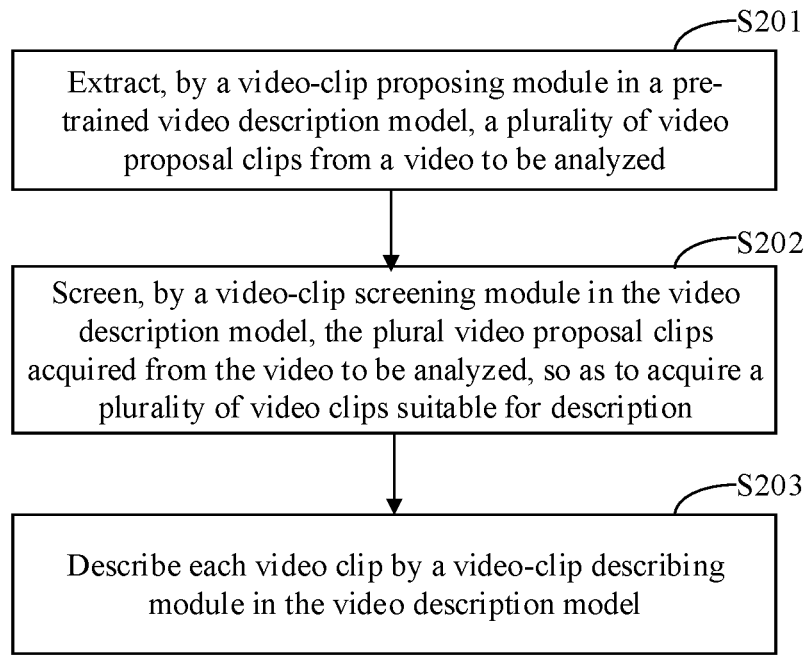
FIG. 2 shows a flow chart of a method for generating descriptions of video clips according to a second embodiment of the present application.

FIG. 2 shows a flow chart of a method for generating descriptions of video clips according to a second embodiment of the present application. As shown in FIG. 2, the method for generating descriptions of video clips according to this embodiment may include the following steps:

S201, extracting, by a video-clip proposing module in a pre-trained video description model, a plurality of video proposal clips from a video to be analyzed;

S202, screening, by a video-clip screening module in the video description model, the plural video proposal clips acquired from the video to be analyzed, so as to acquire a plurality of video clips suitable for description; and S203, describing each video clip by a video-clip describing module in the video description model.

Compared with the above-mentioned embodiment shown in FIG. 1, in this embodiment, for example, the video description model includes the video-clip proposing module, the video-clip screening module and the video-clip describing module. Optionally, in this embodiment, the video-clip proposing module, the video-clip screening module and the video-clip describing module in the video description model are trained jointly before use.

Further optionally, the step 201 in this embodiment of extracting, by a video-clip proposing module in a pre-trained video description model, a plurality of video proposal clips from a video to be analyzed may include the following steps:

(a1) Extracting each video frame in the video to be analyzed;

(b1) Extracting video frame features in the video frames by at least one of a pre-trained first sub-model, a pre-trained second sub-model and a pre-trained third sub-model respectively to obtain corresponding video frame feature sequences, wherein at least one video frame feature sequence is obtained in total.

For example, the first sub-model, the second sub-model and the third sub-model in this embodiment are configured as an I3D-rgb model, an I3D-flow model and a temporal segment network (TSN) model which are pre-trained with a Kinetics data set respectively.

In this embodiment, at least one of the three sub-models may be selected to extract the video feature of each video frame. The video frame features are extracted by one of the sub-models from the video frames sequentially arranged in the same video to form the video frame feature sequence of the video. One corresponding video frame feature sequence may be obtained for each selected sub-model. For example, three video frame feature sequences are obtained correspondingly if three sub-models are selected.

(c1) For each video frame feature sequence, acquiring a corresponding clip confidence map by a pre-trained confidence statistical model, wherein at least one clip confidence map is obtained in total.

In this embodiment, each video frame feature sequence may also be input into a pre-trained confidence statistical model which may output confidence maps of all the clips in the video. For example, one video includes 1000 frames, and may include all video clips from the 1st frame to the 2nd frame, the 1st frame to the 3rd frame, . . . , the 1st frame to the 1000th frame, the 2nd frame to the 3rd frame, the 2nd frame to the 4th frame, . . . , the 2nd frame to the 1000th frame, the 3rd frame to the 4th frame, the 3rd frame to the 5th frame, . . . , the 3rd frame to the 1000th frame, and so on, up to the 999th frame to the 1000th frame. The confidence statistical model may generate the confidence maps for all the clips in the video according to the features of all the video frames of the video to be analyzed. The confidence statistical model may be implemented by a boundary-matching network (BMN) model.

(d1) Acquiring the plural video proposal clips in the video to be analyzed according to the at least one clip confidence map.

If only one clip confidence map is included, which indicates that only one sub-model is selected, at this point, top N video clips may be acquired according to the decreasing confidences of the video clips in the clip confidence map as the corresponding video proposal clips.

The confidences of the video clips may be arranged in a decreasing order, the top N confidences of the video clips are then taken from front to back, and the N video clips corresponding to the top N confidences are acquired as the plural video proposal clips. N in this embodiment may be a positive integer greater than 1.

If at least two clip confidence maps are included, which indicates that more than two sub-models are selected, at this point, weighted fusion may be performed on the confidences of the same clips in the at least two clip confidence maps to obtain the fused confidences of the clips; for example, the clip confidence maps corresponding to the sub-models may have the same weights or different weights according to their respective importance. Finally, the top N video clips are acquired according to the decreasing fused confidences of the clips as the corresponding video proposal clips.

Similarly, the fused confidences of the video clips may be arranged in a decreasing order, the top N fused confidences of the video clips are then taken from front to back, and the N video clips corresponding to the top N confidences are acquired as the plural video proposal clips. N in this embodiment may be a positive integer greater than 1.

Each acquired video proposal clip may be identified by the starting position and the ending position thereof.

Further optionally, the step S202 in this embodiment of screening, by a video-clip screening module in the video description model, the plural video proposal clips acquired from the video to be analyzed, so as to acquire a plurality of video clips suitable for description may include the following steps:

(a2) Acquiring the feature of the video to be analyzed.

For example, the feature of the video to be analyzed in this embodiment may be formed by stitching the features of the sequential video frames in the video to be analyzed. The feature of each video frame may be obtained based on the feature of the corresponding video frame extracted by the sub-model adopted in the above-mentioned step (b1). For example, if only one sub-model is adopted to extract the features of the video frames in the above-mentioned step (b1), only the features of the video frames extracted by this sub-model may be adopted as the features of the video frames to be stitched into the feature of the video. If two or three sub-models are adopted in the above-mentioned step (b1), the features of the video frames extracted by the sub-models may be stitched into the features of the video frames to be stitched into the feature of the video.

For example, in this embodiment, each video frame has a feature represented by 1×1024, and if 100 frames are included in one video, the stitched 2-dimensional feature of the video may be a matrix of 100×1024.

(b2) Acquiring the feature of each video proposal clip.

Similarly, the feature of each video proposal clip may be formed by stitching the features of the sequential video frames in the video proposal clip. For the feature of each video frame, reference is made to the related description in the above-mentioned step (a2), and the feature is not repeated herein.

(c2) Screening the plural video clips suitable for description from the plural video proposal clips using a pre-trained classification model, the feature of the video to be analyzed and the feature of each video proposal clip.

For example, the feature of each of the plural video proposal clips and the feature of the video to be analyzed are input into the classification model, and a probability value output by the classification model is acquired; then, whether the output probability value is greater than a preset probability threshold is judged; if yes, the video proposal clip is determined as one video clip suitable for description, wherein the plural video clips suitable for description may be obtained in total after the plural video proposal clips are screened in this way.

The classification model in this embodiment may be based on a bidirectional long short-term memory (LSTM) network and a multilayer perceptron. The classification model may extract the video proposal clips which are close to the video as the video clips suitable for description by comparing the features of the video with the features of the video proposal clips.

In the step S203 of this embodiment, each video clip is described by the video-clip describing module in the video description model. In the video-clip describing module, the features of the video frames in each video clip may be extracted by a senet152-TSN model pre-trained on a Kinetics data set and then input into a bidirectional LSTM encoder and an LSTM language decoder according to the sequence in the video clip, and the bidirectional LSTM encoder and the LSTM language decoder generate and output the description of the video clip. If one video includes plural video clips suitable for description, the descriptions of the plural video clips may be obtained in this way correspondingly. The descriptions of the plural video clips in the video to be analyzed may serve as an overall description of the content of the video, so as to characterize information of the video.

The method for generating descriptions of video clips according to this embodiment is implemented with the modules in the above-mentioned video description model, and therefore, this embodiment may also be referred to as a use method of the video description model.

In the method for generating descriptions of video clips according to the above-mentioned embodiments, the plural video proposal clips acquired from the video to be analyzed may be screened by the video-clip screening module to acquire the plural video clips suitable for description; and then, each video clip is described by the video-clip describing module, thus avoiding description of all the video proposal clips, only describing the screened video clips which have strong correlation with the video and are suitable for description, removing the interference of the description of the video clips which are not suitable for description in the description of the video, guaranteeing the accuracy of the final descriptions of the video clips, and improving the quality of the descriptions of the video clips. Moreover, since the video-clip screening module is introduced to screen the video clips, the video proposal clips may be more focused on the recall of the video, which may facilitate acquisition of video clips which are more diversified, thus improving diversification of the subsequent descriptions of the video clips.

Further, in the above-mentioned embodiments, the modules in the video description model are pre-trained in advance, thus solving the technical problems that models are trained independently in the prior art to cause inapplicability among the models and descriptions of video clips are inaccurate; the joint pre-training process of the modules in the video description model may effectively guarantee the compatibility among the modules in the video description model, and the consistency of a training process and an application process, avoid the condition of a good training effect but an unsatisfactory application effect, guarantee the improvement of the overall effect during the application, and effectively improve the quality and accuracy of the descriptions of the video clips.

Further, in the method for generating descriptions of video clips according to the above-mentioned embodiments, the at least one video frame feature sequence is acquired by at least one of the pre-trained first sub-model, the pre-trained second sub-model and the pre-trained third sub-model; the at least one clip confidence map is acquired by the pre-trained confidence statistical model; the plural video proposal clips in the video to be analyzed are acquired according to the at least one clip confidence map; this solution is more focused on the recall of the proposal clips, thus acquiring the video proposal clips which are more diversified, guaranteeing the completeness and diversity of the video proposal clips, and then facilitating subsequent acquisition of the more comprehensive and accurate descriptions of the video clips.

Furthermore, in the above-mentioned embodiments, the corresponding video frame feature sequences may be acquired by at least two sub-models, so as to acquire the corresponding clip confidence maps, and the confidences of the same clips in the at least two clip confidence maps are subjected to the weighted fusion to obtain the fused confidences of the clips, which guarantees the quality of the video proposal clips when the video proposal clips are extracted based on the fused confidences of the clips, and then guarantees the quality of the video clips suitable for description, thus effectively improving the accuracy of the final description of the video.

Moreover, in the above-mentioned embodiments, the plural video clips suitable for description may be screened from the plural video proposal clips using the pre-trained classification model, the feature of the video to be analyzed and the feature of each video proposal clip, thus screening the video proposal clips with the strongest correlation with the video as the video clips suitable for description, and then effectively improving the accuracy of the description of the video to guarantee the quality of the description of the video.

Figure 3:
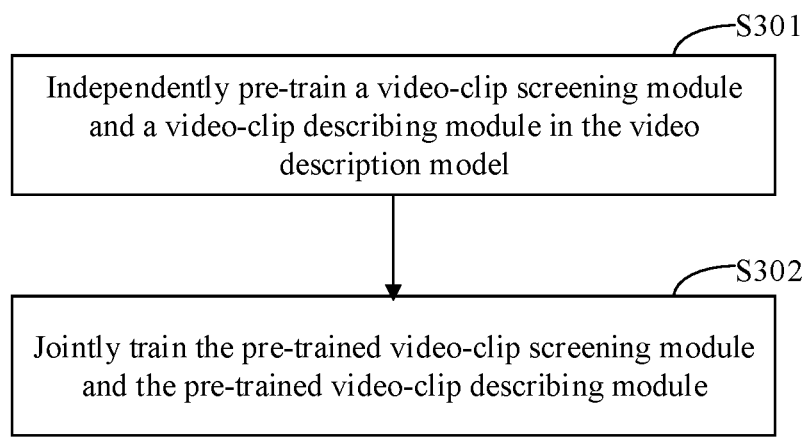
FIG. 3 shows a flow chart of a method for training a video description model according to a third embodiment of the present application.

FIG. 3 shows a flow chart of a method for training a video description model according to a third embodiment of the present application. As shown in FIG. 3, the method for training a video description model according to this embodiment may include the following steps:

S301, independently pre-training a video-clip screening module and a video-clip describing module in the video description model; and S302, jointly training the pre-trained video-clip screening module and the pre-trained video-clip describing module.

Figure 4:
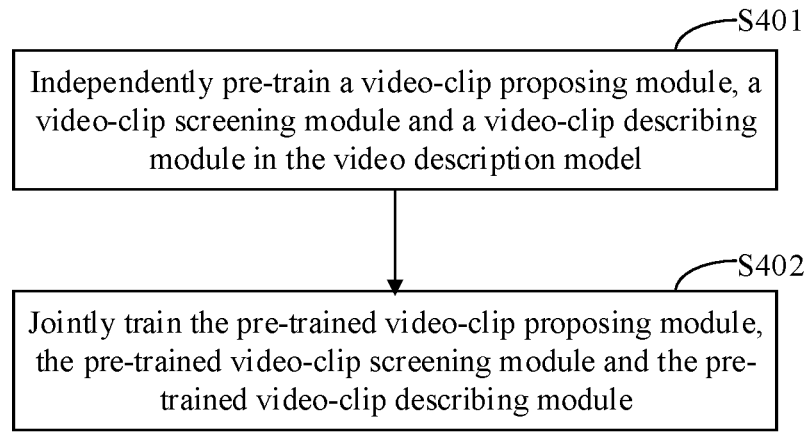
FIG. 4 shows a flow chart of a method for training a video description model according to a fourth embodiment of the present application.

Correspondingly, if the video description model further includes a video-clip proposing module, for the corresponding method for training the video description model, specific reference may be made to a flowchart of a method for training a video description model according to a fourth embodiment shown in FIG. 4, and the method may include the following steps:

S401, independently pre-training the video-clip proposing module, the video-clip screening module and the video-clip describing module in the video description model; and S402, jointly training the pre-trained video-clip proposing module, the pre-trained video-clip screening module and the pre-trained video-clip describing module.

For example, in the process of jointly training the video-clip proposing module, the video-clip screening module and the video-clip describing module, any two of the video-clip proposing module, the video-clip screening module and the video-clip describing module may be kept fixed in sequence, and the third module is trained with a reinforcement learning method until the three modules are trained respectively.

For example, the step S401 in this embodiment of independently pre-training the video-clip proposing module, the video-clip screening module and the video-clip describing module in the video description model may include the following steps:

(a3) independently training the video-clip proposing module utilizing starting and ending points of clips in training videos which are annotated artificially.

Specifically, before the training process, a plurality of training videos may be collected in advance, a plurality of video proposal clips of each training video are artificially annotated with starting and ending points, and the corresponding video proposal clips which are annotated artificially should all have confidences of 1. In the training process, the above-mentioned steps (a1) to (d1) are executed to acquire a final clip confidence map predicted by the video-clip proposing module; then, whether the confidences of the plural video proposal clips which are annotated artificially in the predicted clip confidence map are all 1 is judged, and if not, parameters of the confidence statistical model (i.e., BMN model) are adjusted to enable values of the confidences of the plural video proposal clips which are annotated artificially in the predicted clip confidence map to have a tendency to 1. In this way, the video-clip proposing module, specifically, the BMN model in the video-clip proposing module, is continuously trained with the plural training videos until the confidences of the plural video proposal clips which are annotated artificially in the clip confidence maps predicted in continuous preset rounds of training are always 1, and at this point, the parameters of the BMN model and the BMN model are determined, and then the video-clip proposing module is determined. The number of the continuous preset rounds may be 100, 200, 300 or other integers.

It should be noted that, according to the above-mentioned steps (a1) to (d1), the video-clip proposing module includes not only the BMN model, but also at least one of an I3D-rgb model, an I3D-flow model and a TSN model. However, in this embodiment, the I3D-rgb model, the I3D-flow model and the TSN model are pre-trained according to the Kinetics data set, and in the process of training the video-clip proposing module, only the BMN model is required to be trained, and the I3D-rgb model, the I3D-flow model and the TSN model are not required to be trained again.

The recall under a fixed number N of proposal clips may be maximized through the training process of the video-clip proposing module.

(b3) Independently training the video-clip screening module using K video clips which are annotated manually and are suitable for description in N video proposal clips of each of a plurality of training videos.

Specifically, before the training process, a plurality of training videos may be collected in advance, and in the way of the above-mentioned embodiment, N video proposal clips are extracted from each training video, and top K clips according to a decreasing confidence order are annotated as clips suitable for description. In the training process, the K video clips suitable for description may be screened from the N video proposal clips in the way of the steps (a2) to (c2) in the above-mentioned embodiment. Then, the K screened video clips are compared with the pre-annotated clips to judge whether they are consistent, and if not, parameters of the classification model, i.e., a classification model based on the bidirectional LSTM and the multilayer perceptron, are adjusted to enable the predicted clips to be consistent with the annotated clips. In this way, the classification model based on the bidirectional LSTM and the multilayer perceptron is continuously trained with information of the plural training videos until the predicted clips are consistent with the annotated clips in continuous preset rounds of training, the parameters of the classification model based on the bidirectional LSTM and the multilayer perceptron and the classification model based on the bidirectional LSTM and the multilayer perceptron are determined, and then, the video-clip screening module is determined.

(c3) Independently training the video-clip describing module using descriptions of K clips which are annotated manually in each of a plurality of training videos.

Specifically, the video-clip describing module is trained with a maximum likelihood estimation (MLE) method. Specifically, in the training process, in the way of the above-mentioned step S203, the probability of each word in the generated description is compared with the probability of a word corresponding to artificial annotation, and if the difference is large, parameters of the video-clip describing module are adjusted to enable the generated description to be close to an artificial description.

From the above-mentioned embodiments, the video-clip describing module in this embodiment includes the senet152-TSN model, the bidirectional LSTM encoder and the LSTM language decoder, but the senet152-TSN model is pre-trained with the Kinetics data set. Only parameters of the bidirectional LSTM encoder and the LSTM language decoder are required to be adjusted in the process of training the video-clip describing module.

The three modules are independently trained in the above-mentioned steps (a3) to (c3); however, in practical applications, in order to make the training process consistent with the application process, in this embodiment, after trained independently, the three modules are trained jointly, such that the trained video description model may be more suitable for application scenarios to guarantee an application effect.

For example, the step S402 of jointly training the pre-trained video-clip proposing module, the pre-trained video-clip screening module and the pre-trained video-clip describing module may include the following steps:

(a4) Fixing the video-clip proposing module and the video-clip screening module in the video description model, taking a video METEOR score as reward, and training a video-description generating module using a reinforcement learning method;

(b4) Fixing the video-clip screening module and the video-description generating module in the video description model, taking the video METEOR score as reward, and training the video-clip proposing module using a reinforcement learning method;

(c4) Fixing the video-clip proposing module and the video-description generating module in the video description model, taking the video METEOR score as reward, and training the video-clip screening module using a reinforcement learning method; and repeating the above-mentioned steps (a4) to (c4) until the video METEOR score is maximum, and ending the training process.

The steps (a4) to (c4) in this embodiment are executed after the above-mentioned steps (a3) to (c3), and at this point, the video-clip proposing module, the video-clip screening module and the video-description generating module are pre-trained independently.

The Meteor score in this embodiment is an overall score of one video obtained based on the descriptions generated by the video-description generating module for a plurality of video clips suitable for description. For example, the Meteor score of each video may be calculated based on Meteor 0.5 IOU, and the training process of the steps (a4) to (c4) in this embodiment takes convergence of the Meteor score as a training termination condition.

Specifically, in the training process, each training video may be input into the video description model, and descriptions of a plurality of video clips suitable for description of the training video may be output after the training video is processed by the video-clip proposing module, the video-clip screening module and the video-description generating module. At this point, based on Meteor 0.5 IOU, the Meteor score of the video may be calculated according to the acquired descriptions of the plural video clips. Meanwhile, whether the current Meteor score tends to converge in an increasing direction relative to the Meteor score calculated with the previous training video; for example, in the training process of the step (a4), if the convergence is not achieved, the parameters of the video-clip proposing module and the video-clip screening module are fixed, and the parameters of the video-description generating module are adjusted to enable the calculated Meteor score to continuously tend to converge in the increasing direction. In the training process of the step (b4), if the convergence is not achieved, the parameters of the video-clip screening module and the video-description generating module are fixed, and the parameters of the video-clip proposing module are adjusted to enable the calculated Meteor score to continuously tend to converge in the increasing direction. In the training process of the step (c4), if the convergence is not achieved, the parameters of the video-clip proposing module and the video-description generating module are fixed, and the parameters of the video-clip screening module are adjusted to enable the calculated Meteor score to continuously tend to converge in the increasing direction.

In practical applications, the step (b4) is executed after the video-description generating module is trained and the video METROR score converges in the above-mentioned step (a4), the step (c4) is executed after the video-clip proposing module is trained and the video METROR score converges in the step (b4), and after the video-clip screening module is trained and the video METROR score converges in the step (c4), the process is further required to return to the steps (a4), (b4) and (c4) for continuous training until the video METEOR score of each step still converges after repeated training and the parameters of the three modules are not required to be adjusted, and at this point, the joint training process is finished, and the parameters of the video-clip proposing module, the video-clip screening module and the video-description generating module are determined.

In practical applications, the order of the above-mentioned steps (a4) to (c4) may be other orders, and is not limited herein.

In the above-mentioned embodiment, the training process of the video description model is described with the video description model including the video-clip proposing module, the video-clip screening module and the video-clip describing module as an example. If the proposal clips in the video are manually extracted in practical applications, the video-clip proposing module is omitted, the video description model only includes the video-clip screening module and the video-clip describing module, and implementation principles are the same and are not repeated herein.

In the method for training a video description model according to the above-mentioned embodiment, the modules in the video description model are not only pre-trained independently, but also jointly trained, thus avoiding the problem that the application and training processes are inconsistent after the independent training process to cause the inaccuracy of the descriptions of the video clips, and effectively improving the accuracy and quality of the descriptions of the video clips.

Figure 5:
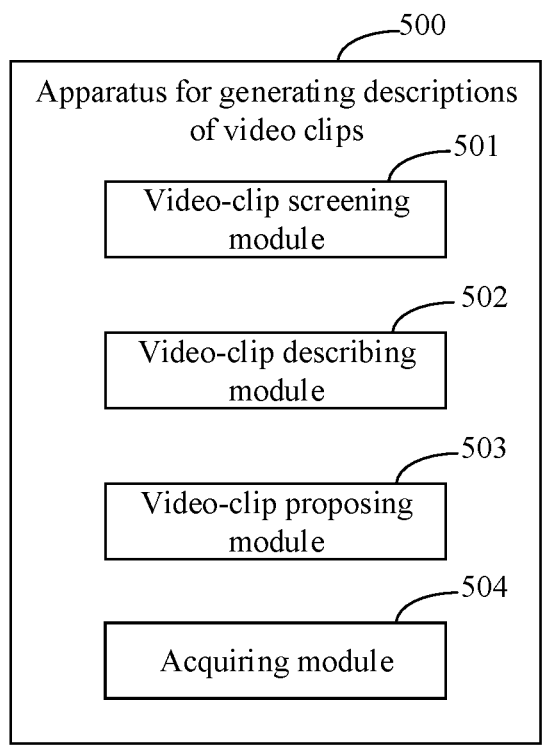
FIG. 5 shows a structural diagram of an apparatus for generating descriptions of video clips according to a fifth embodiment of the present application.

FIG. 5 shows a structural diagram of an apparatus for generating descriptions of video clips according to a fifth embodiment of the present application. As shown in FIG. 5, the apparatus 500 for generating descriptions of video clips according to this embodiment includes: a video-clip screening module 501 configured to screen a plurality of video proposal clips acquired from a video to be analyzed, so as to acquire a plurality of video clips suitable for description; and a video-clip describing module 502 configured to describe each video clip.

The apparatus 500 for generating descriptions of video clips according to this embodiment is configured as the video description model in the above-mentioned embodiment.

Further optionally, in the apparatus 500 for generating descriptions of video clips according to this embodiment, the video-clip screening module 501 and the video-clip describing module 502 in the video description model are trained jointly.

Further optionally, the apparatus 500 for generating descriptions of video clips according to this embodiment further includes: a video-clip proposing module 503 configured to extract the plural video proposal clips from the video to be analyzed; or an acquiring module 504 configured to acquire the plural video proposal clips manually extracted from the video to be analyzed; further, the video-clip proposing module 503, the video-clip screening module 501 and the video-clip describing module 502 are trained jointly if the video-clip proposing module 503 is included.

Further optionally, in the apparatus 500 for generating descriptions of video clips according to this embodiment, the video-clip proposing module 503 is specifically configured to: extract each video frame in the video to be analyzed; extract video frame features in the video frames by at least one of a pre-trained first sub-model, a pre-trained second sub-model and a pre-trained third sub-model respectively to obtain corresponding video frame feature sequences, wherein at least one video frame feature sequence is obtained in total; for each video frame feature sequence, acquire a corresponding clip confidence map by a pre-trained confidence statistical model, wherein at least one clip confidence map is obtained in total; and acquire the plural video proposal clips in the video to be analyzed according to the at least one clip confidence map.

Further optionally, in the apparatus 500 for generating descriptions of video clips according to this embodiment, the video-clip proposing module 503 is specifically configured to: if only one clip confidence map is included, acquire top N video clips according to the decreasing confidences of the video clips in the clip confidence map as the corresponding video proposal clips; and if at least two clip confidence maps are included, perform weighted fusion on the confidences of the same clips in the at least two clip confidence maps to obtain the fused confidences of the clips; and acquire top N video clips according to the decreasing fused confidences of the clips as the corresponding video proposal clips.

Further optionally, in the apparatus 500 for generating descriptions of video clips according to this embodiment, the video-clip screening module 502 is specifically configured to: acquire the feature of the video to be analyzed; acquire the feature of each video proposal clip; and screen the plural video clips suitable for description from the plural video proposal clips using a pre-trained classification model, the feature of the video to be analyzed and the feature of each video proposal clip.

Further optionally, in the apparatus 500 for generating descriptions of video clips according to this embodiment, the video-clip screening module 502 is specifically configured to: input the feature of each of the plural video proposal clips and the feature of the video to be analyzed into the classification model, and acquire a probability value output by the classification model; judge whether the output probability value is greater than a preset probability threshold; and if yes, determine the video proposal clip as one video clip suitable for description, wherein the plural video clips suitable for description are obtained in total.

The apparatus for generating descriptions of video clips according to this embodiment has the same implementation as the above-mentioned relevant method embodiment by adopting the above-mentioned modules to implement the implementation principle and the technical effects of descriptions of video clips, and for details, reference may be made to the description of the above-mentioned relevant method embodiment, and details are not repeated herein.

Figure 6:
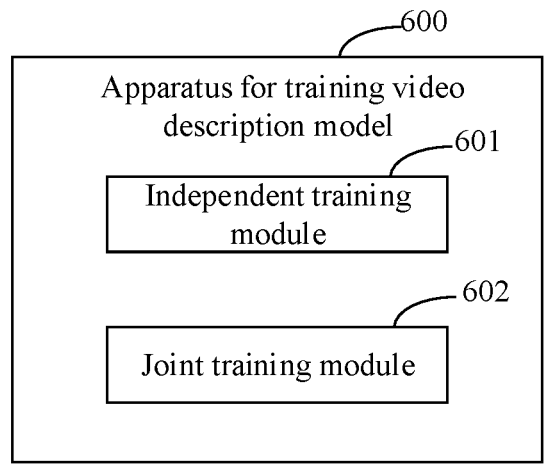
FIG. 6 shows a structural diagram of an apparatus for training a video description model according to a sixth embodiment of the present application.

FIG. 6 shows a structural diagram of an apparatus for training a video description model according to a sixth embodiment of the present application. As shown in FIG. 6, the apparatus 600 for training a video description model according to this embodiment includes: an independent training module 601 configured to independently pre-train a video-clip screening module and a video-clip describing module in the video description model; and a joint training module 602 configured to jointly train the pre-trained video-clip screening module and the pre-trained video-clip describing module.

Further optionally, if the video description model further includes a video-clip proposing module, the independent training module 601 is configured to independently pre-train the video-clip proposing module in the video description model; and the joint training module 602 is configured to jointly train the pre-trained video-clip proposing module, the pre-trained video-clip screening module and the pre-trained video-clip describing module.

Further optionally, the joint training module 602 is configured to: keep any two of the video-clip proposing module, the video-clip screening module and the video-clip describing module fixed in sequence, and train the third module with a reinforcement learning method until the three modules are trained.

The apparatus 600 for training a video description model according to this embodiment has the same implementation as the above-mentioned relevant method embodiment by adopting the above-mentioned modules to implement the implementation principle and the technical effects of training the video description model, and for details, reference may be made to the description of the above-mentioned relevant method embodiment, and details are not repeated herein.

According to the embodiment of the present application, there are also provided an electronic device and a readable storage medium.

Figure 7:
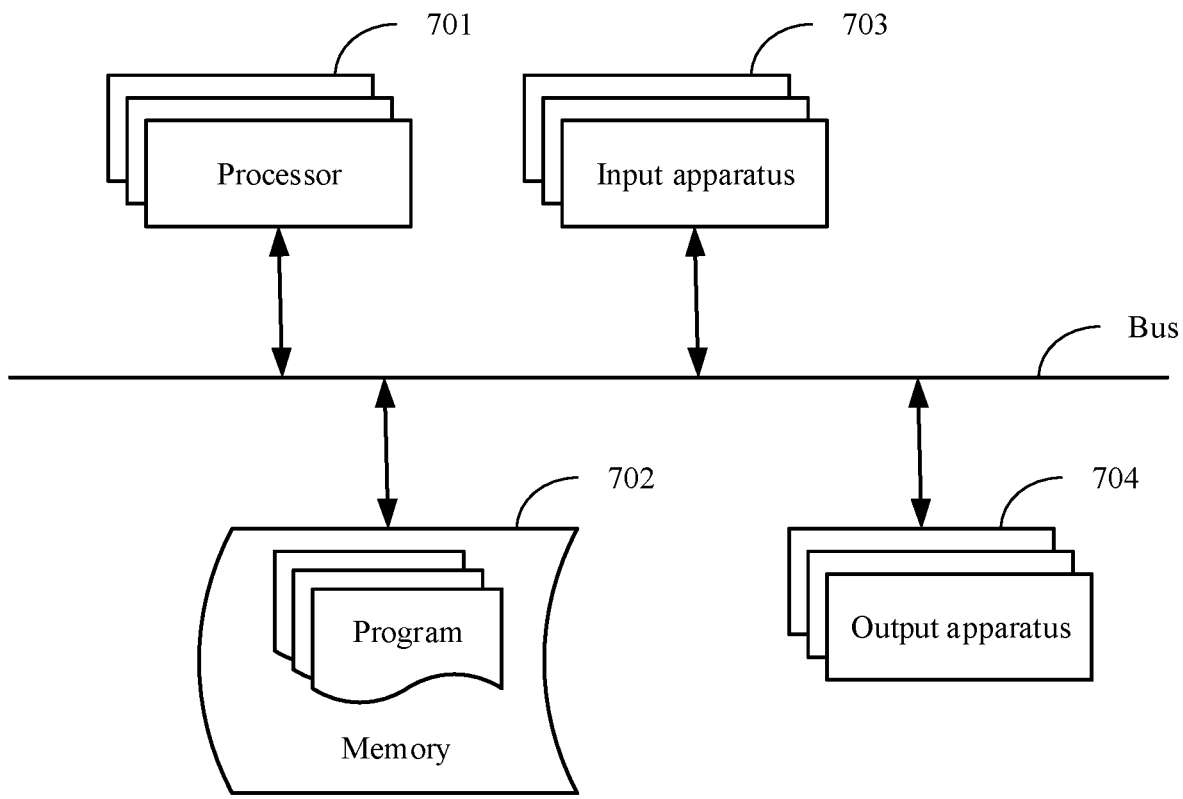
FIG. 7 is a block diagram of an electronic device configured to implement the above-mentioned methods according to the embodiments of the present application.

FIG. 7 is a block diagram of an electronic device configured to implement the above-mentioned methods according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein. For example, the electronic device according to this embodiment may be configured to implement the above-mentioned method for generating descriptions of video clips or the above-mentioned method for training a video description model.

As shown in FIG. 7, the electronic device includes one or more processors 701, a memory 702, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 7, one processor 701 is taken as an example.

The memory 702 is configured as the non-transitory computer readable storage medium according to the present application. The memory stores instructions executable by the at least one processor to cause the at least one processor to perform the method for generating descriptions of video clips or the method for training a video description model according to the present application. The non-transitory computer readable storage medium according to the present application stores computer instructions for causing a computer to perform the method for generating descriptions of video clips or the method for training a video description model according to the present application.

The memory 702 which is a non-transitory computer readable storage medium may be configured to store non-transitory software programs, non-transitory computer executable programs and modules, such as program instructions/modules corresponding to the method for generating descriptions of video clips or the method for training a video description model according to the embodiments of the present application (for example, the relevant modules shown in FIG. 5 or 6). The processor 701 executes various functional applications and data processing of a server, that is, implements the method for generating descriptions of video clips or the method for training a video description model according to the above-mentioned embodiments, by running the non-transitory software programs, instructions, and modules stored in the memory 702.

The memory 702 may include a program storage area and a data storage area, wherein the program storage area may store an operating system and an application program required for at least one function; the data storage area may store data created according to use of the electronic device for implementing the method for generating descriptions of video clips or the method for training a video description model, or the like. Furthermore, the memory 702 may include a high-speed random access memory, or a non-transitory memory, such as at least one magnetic disk storage device, a flash memory device, or other non-transitory solid state storage devices. In some embodiments, optionally, the memory 702 may include memories remote from the processor 701, and such remote memories may be connected via a network to the electronic device for implementing the method for generating descriptions of video clips or the method for training a video description model. Examples of such a network include, but are not limited to, the Internet, intranets, local area networks, mobile communication networks, and combinations thereof.

The electronic device for implementing the method for generating descriptions of video clips or the method for training a video description model may further include an input apparatus 703 and an output apparatus 704. The processor 701, the memory 702, the input apparatus 703 and the output apparatus 704 may be connected by a bus or other means, and FIG. 7 takes the connection by a bus as an example.

The input apparatus 703 may receive input numeric or character information and generate key signal input related to user settings and function control of the electronic device for implementing the method for generating descriptions of video clips or the method for training a video description model, such as a touch screen, a keypad, a mouse, a track pad, a touch pad, a pointing stick, one or more mouse buttons, a trackball, a joystick, or the like. The output apparatus 704 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

According to the technical solution of the embodiments of the present application, the plural video proposal clips acquired from the video to be analyzed may be screened by the video-clip screening module to acquire the plural video clips suitable for description; and then, each video clip is described by the video-clip describing module, thus avoiding description of all the video proposal clips, only describing the screened video clips which have strong correlation with the video and are suitable for description, removing the interference of the description of the video clips which are not suitable for description in the description of the video, guaranteeing the accuracy of the final descriptions of the video clips, and improving the quality of the descriptions of the video clips. Moreover, since the video-clip screening module is introduced to screen the video clips, the video proposal clips may be more focused on the recall of the video, which may facilitate acquisition of video clips which are more diversified, thus improving diversification of the subsequent descriptions of the video clips.

Further, according to the technical solution of the embodiments of the present application, the modules in the video description model are pre-trained in advance, thus solving the technical problems that models are trained independently in the prior art to cause inapplicability among the models and descriptions of video clips are inaccurate; the joint pre-training process of the modules in the video description model may effectively guarantee the compatibility among the modules in the video description model, and the consistency of a training process and an application process, avoid the condition of a good training effect but an unsatisfactory application effect, guarantee the improvement of the overall effect during the application, and effectively improve the quality and accuracy of the descriptions of the video clips.

Further, according to the technical solution of the embodiments of the present application, the at least one video frame feature sequence is acquired by at least one of the pre-trained first sub-model, the pre-trained second sub-model and the pre-trained third sub-model; the at least one clip confidence map is acquired by the pre-trained confidence statistical model; the plural video proposal clips in the video to be analyzed are acquired according to the at least one clip confidence map; this solution is more focused on the recall of the proposal clips, thus acquiring the video proposal clips which are more diversified, guaranteeing the completeness and diversity of the video proposal clips, and then facilitating subsequent acquisition of the more comprehensive and accurate descriptions of the video clips.

Furthermore, according to the technical solution of the embodiments of the present application, the corresponding video frame feature sequences may be acquired by at least two sub-models, so as to acquire the corresponding clip confidence maps, and the confidences of the same clips in the at least two clip confidence maps are subjected to the weighted fusion to obtain the fused confidences of the clips, which guarantees the quality of the video proposal clips when the video proposal clips are extracted based on the fused confidences of the clips, and then guarantees the quality of the video clips suitable for description, thus effectively improving the accuracy of the final description of the video.

Moreover, according to the technical solution of the embodiments of the present application, the plural video clips suitable for description may be screened from the plural video proposal clips using the pre-trained classification model, the feature of the video to be analyzed and the feature of each video proposal clip, thus screening the video proposal clips with the strongest correlation with the video as the video clips suitable for description, and then effectively improving the accuracy of the description of the video to guarantee the quality of the description of the video.

According to the technical solution of the embodiments of the present application, in the training process, the modules in the video description model are not only pre-trained independently, but also jointly trained, thus avoiding the problem that the application and training processes are inconsistent after the independent training process to cause the inaccuracy of the descriptions of the video clips, and effectively improving the accuracy and quality of the descriptions of the video clips.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for generating descriptions of video clips, comprising:
   screening, by a video-clip screening module in a video description model, a plurality of video proposal clips acquired from a video to be analyzed, so as to acquire a plurality of video clips suitable for description; and
   describing each video clip by a video-clip describing module in the video description model.

2. The method according to claim 1, wherein the video-clip screening module and the video-clip describing module in the video description model are trained jointly.

3. The method according to claim 2, wherein before the screening, by a video-clip screening module in a video description model, a plurality of pre-acquired video proposal clips, so as to acquire a plurality of video clips suitable for description, the method further comprises:
   extracting, by a video-clip proposing module in the pre-trained video description model, the plural video proposal clips from the video to be analyzed; or
   acquiring the plural video proposal clips manually extracted from the video to be analyzed;
   further, the video-clip proposing module, the video-clip screening module and the video-clip describing module in the video description model are trained jointly if the video description model further comprises the video-clip proposing module.

4. The method according to claim 3, wherein the extracting, by a video-clip proposing module in the pre-trained video description model, the plural video proposal clips from the video to be analyzed comprises:
   extracting each video frame in the video to be analyzed;
   extracting video frame features in the video frames by at least one of a pre-trained first sub-model, a pre-trained second sub-model and a pre-trained third sub-model respectively to obtain corresponding video frame feature sequences, wherein at least one video frame feature sequence is obtained in total;
   for each video frame feature sequence, acquiring a corresponding clip confidence map by a pre-trained confidence statistical model, wherein at least one clip confidence map is obtained in total; and
   acquiring the plural video proposal clips in the video to be analyzed according to the at least one clip confidence map.

5. The method according to claim 4, wherein the acquiring the plural video proposal clips in the video to be analyzed according to the at least one clip confidence map comprises:
   if only one clip confidence map is comprised, acquiring top N video clips according to the decreasing confidences of the video clips in the clip confidence map as the corresponding video proposal clips; and
   if at least two clip confidence maps are comprised, performing weighted fusion on the confidences of the same clips in the at least two clip confidence maps to obtain the fused confidences of the clips; and acquiring top N video clips according to the decreasing fused confidences of the clips as the corresponding video proposal clips.

6. The method according to claim 4, wherein the screening, by a video-clip screening module in a video description model, a plurality of video proposal clips, so as to acquire a plurality of video clips suitable for description comprises:
   acquiring the feature of the video to be analyzed;
   acquiring the feature of each video proposal clip; and
   screening the plural video clips suitable for description from the plural video proposal clips using a pre-trained classification model, the feature of the video to be analyzed and the feature of each video proposal clip.

7. The method according to claim 6, wherein the screening the plural video clips suitable for description from the plural video proposal clips using a pre-trained classification model, the feature of the video to be analyzed and the feature of each video proposal clip comprises:
   inputting the feature of each of the plural video proposal clips and the feature of the video to be analyzed into the classification model, and acquiring a probability value output by the classification model;
   judging whether the output probability value is greater than a preset probability threshold; and
   if yes, determining the video proposal clip as one video clip suitable for description, wherein the plural video clips suitable for description are obtained in total.

8. A method for training a video description model, comprising:
   independently pre-training a video-clip screening module and a video-clip describing module in the video description model; and
   jointly training the pre-trained video-clip screening module and the pre-trained video-clip describing module.

9. The method according to claim 8, wherein if the video description model further comprises a video-clip proposing module, the method further comprises:
   independently pre-training the video-clip proposing module in the video description model; and
   jointly training the pre-trained video-clip proposing module, the pre-trained video-clip screening module and the pre-trained video-clip describing module.

10. The method according to claim 9, wherein the jointly training the pre-trained video-clip proposing module, the pre-trained video-clip screening module and the pre-trained video-clip describing module comprises:

keeping any two of the video-clip proposing module, the video-clip screening module and the video-clip describing module fixed in sequence, and training the third module with a reinforcement learning method until the three modules are trained.

11. An electronic device, comprising:

at least one processor; and a memory communicatively connected with the at least one processor;

wherein the memory stores instructions executable by the at least one processor, and the instructions are executed by the at least one processor to enable the at least one processor to perform a method for generating descriptions of video clips according to claim 1.

12. The electronic device according to claim 11, wherein the video-clip screening module and the video-clip describing module in the video description model are trained jointly.

13. The electronic device according to claim 12, wherein before the screening, by a video-clip screening module in a video description model, a plurality of pre-acquired video proposal clips, so as to acquire a plurality of video clips suitable for description, the method further comprises:

extracting, by a video-clip proposing module in the pre-trained video description model, the plural video proposal clips from the video to be analyzed; or acquiring the plural video proposal clips manually extracted from the video to be analyzed;

further, the video-clip proposing module, the video-clip screening module and the video-clip describing module in the video description model are trained jointly if the video description model further comprises the video-clip proposing module.

14. The electronic device according to claim 13, wherein the extracting, by a video-clip proposing module in the pre-trained video description model, the plural video proposal clips from the video to be analyzed comprises:

extracting each video frame in the video to be analyzed;

extracting video frame features in the video frames by at least one of a pre-trained first sub-model, a pre-trained second sub-model and a pre-trained third sub-model respectively to obtain corresponding video frame feature sequences, wherein at least one video frame feature sequence is obtained in total;

for each video frame feature sequence, acquiring a corresponding clip confidence map by a pre-trained confidence statistical model, wherein at least one clip confidence map is obtained in total; and acquiring the plural video proposal clips in the video to be analyzed according to the at least one clip confidence map.

15. The electronic device according to claim 14, wherein the acquiring the plural video proposal clips in the video to be analyzed according to the at least one clip confidence map comprises:

if only one clip confidence map is comprised, acquiring top N video clips according to the decreasing confidences of the video clips in the clip confidence map as the corresponding video proposal clips; and if at least two clip confidence maps are comprised, performing weighted fusion on the confidences of the same clips in the at least two clip confidence maps to obtain the fused confidences of the clips; and acquire top N video clips according to the decreasing fused confidences of the clips as the corresponding video proposal clips.

16. The electronic device according to claim 14, wherein the screening, by a video-clip screening module in a video description model, a plurality of video proposal clips, so as to acquire a plurality of video clips suitable for description comprises:

acquiring the feature of the video to be analyzed;

acquiring the feature of each video proposal clip; and screening the plural video clips suitable for description from the plural video proposal clips using a pre-trained classification model, the feature of the video to be analyzed and the feature of each video proposal clip.

17. An electronic device, comprising:

at least one processor; and a memory communicatively connected with the at least one processor;

wherein the memory stores instructions executable by the at least one processor, and the instructions are executed by the at least one processor to enable the at least one processor to perform a method for training a video description model according to claim 8.

18. The electronic device according to claim 17, wherein if the video description model further comprises a video-clip proposing module, the method further comprises:

independently pre-training the video-clip proposing module in the video description model; and jointly training the pre-trained video-clip proposing module, the pre-trained video-clip screening module and the pre-trained video-clip describing module.

19. A non-transitory computer-readable storage medium storing computer instructions therein, wherein the computer instructions are used to cause the computer to perform a method for generating descriptions of video clips according to claim 1.

20. A non-transitory computer-readable storage medium storing computer instructions therein, wherein the computer instructions are used to cause the computer to perform a method for training a video description model according to claim 8.

* * * * *